US00RE46406E

(19) United States
(12) Reissued Patent
Hooli et al.

(10) Patent Number: US RE46,406 E
(45) Date of Reissued Patent: May 16, 2017

(54) METHODS, APPARATUSES, SYSTEM, AND RELATED COMPUTER PROGRAM PRODUCT FOR RESOURCE ALLOCATION

(71) Applicants: Kari Juhani Hooli, Oulu (FI); Kari Pekka Pajukoski, Oulu (FI); Esa Tapani Tiirola, Kempele (FI)

(72) Inventors: Kari Juhani Hooli, Oulu (FI); Kari Pekka Pajukoski, Oulu (FI); Esa Tapani Tiirola, Kempele (FI)

(73) Assignee: CELLULAR COMMUNICATIONS EQUIPMENT LLC, Plano, TX (US)

(21) Appl. No.: 14/625,525

(22) Filed: Feb. 18, 2015

Related U.S. Patent Documents

Reissue of:
(64) Patent No.: 8,379,590
Issued: Feb. 19, 2013
Appl. No.: 12/734,430
PCT Filed: Oct. 20, 2008
PCT No.: PCT/EP2008/061425
§ 371 (c)(1),
(2) Date: Jul. 26, 2010
PCT Pub. No.: WO2009/056464
PCT Pub. Date: May 7, 2010

(30) Foreign Application Priority Data

Oct. 30, 2007 (EP) ..... 07119645

(51) Int. Cl.
*H04W 4/00* (2009.01)
*H04J 4/00* (2006.01)
(Continued)

(52) U.S. Cl.
CPC ..... *H04J 11/00* (2013.01); *H04L 5/0007* (2013.01); *H04L 5/0037* (2013.01);
(Continued)

(58) Field of Classification Search
CPC ..... H04J 11/00; H04J 13/0074; H04J 13/10; H04L 5/0037; H04L 5/0023; H04L 5/0007; H04L 27/2613; H04L 5/0092
See application file for complete search history.

(56) References Cited

U.S. PATENT DOCUMENTS 8,036,197 B2 * 10/2011 Pajukoski ..... H04B 1/7103 370/342
8,155,070 B2 * 4/2012 Lee ..... H04L 1/1861 370/329
(Continued)

FOREIGN PATENT DOCUMENTS

EP 07119645.5 * 10/2007
EP 1865733 A1 * 12/2007 ..... H04Q 7/36
(Continued)

OTHER PUBLICATIONS

Frank, T., A. Klein, E. Costa, and E. Schulz "IFDMA—A Promising Multiple Access Scheme for Future Mobile Radio Systems". 16th IEEE International Symposium on Personal, Indoor and Mobile Radio Communications, Sep. 11-14, 2005, pp. 1214-1218.*
(Continued)

*Primary Examiner* — Luke S Wassum
(74) *Attorney, Agent, or Firm* — Procopio, Cory, Hargreaves & Savitch LLP

(57) ABSTRACT

Respective demodulation reference signals (DM RS) of a user bandwidth can be cyclically shifted with respect to each other. An uplink scheduling grant may include an index for a DM RS resource having a cyclic shift and an orthogonal cover code or interleaved frequency division multiple comb. A usage orthogonal cover or interleaved frequency division multiple comb may be configured using radio resource control message and may optionally be tied statically into DM RS resources. At least some of respective demodulation
(Continued)

reference signals of the at least two user bandwidths may be mutually orthogonal.

27 Claims, 5 Drawing Sheets

(51) Int. Cl.

| | |
|---|---|
| ***H04J 11/00*** | (2006.01) |
| ***H04J 1/00*** | (2006.01) |
| ***H04L 5/00*** | (2006.01) |
| ***H04L 27/26*** | (2006.01) |
| *H04J 13/10* | (2011.01) |
| *H04J 13/00* | (2011.01) |

(52) U.S. Cl.
CPC ..... *H04L 27/2613* (2013.01); *H04J 13/0074* (2013.01); *H04J 13/10* (2013.01); *H04L 5/0023* (2013.01); *H04L 5/0092* (2013.01)

(56) References Cited

U.S. PATENT DOCUMENTS

| | | | | |
|---|---|---|---|---|
| 8,165,159 | B2 * | 4/2012 | Oketani | H04J 13/0059 370/468 |
| 8,891,493 | B2 * | 11/2014 | Inoue | H04B 1/707 370/335 |
| 8,989,308 | B2 * | 3/2015 | Hooli | H04L 27/2613 375/267 |
| 2002/0186750 | A1 | 12/2002 | Callaway, Jr. et al. | |
| 2006/0274839 | A1 * | 12/2006 | Fukuta | H04L 5/0007 375/260 |
| 2007/0171995 | A1 * | 7/2007 | Muharemovic | H04B 1/707 375/260 |
| 2007/0183386 | A1 * | 8/2007 | Muharemovic | H04L 5/023 370/344 |
| 2007/0183516 | A1 * | 8/2007 | Monogioudis | H04L 5/0007 375/260 |
| 2007/0211619 | A1 * | 9/2007 | Jalloul | H04B 1/707 370/209 |
| 2007/0297381 | A1 * | 12/2007 | Oketani et al. | H04L 5/0048 370/338 |
| 2008/0025200 | A1 * | 1/2008 | Tiirola | H04L 5/023 370/210 |
| 2008/0049668 | A1 * | 2/2008 | Kakura | H04L 1/20 370/329 |
| 2008/0051125 | A1 * | 2/2008 | Muharemovic | H04W 72/1231 455/519 |
| 2008/0080472 | A1 * | 4/2008 | Bertrand | H04J 11/005 370/344 |
| 2008/0080560 | A1 * | 4/2008 | Inoue | H04L 1/1671 370/491 |
| 2008/0095036 | A1 * | 4/2008 | Gorokhov | H04L 5/0007 370/203 |
| 2008/0101440 | A1 * | 5/2008 | Lee | H04J 13/00 375/141 |
| 2008/0205348 | A1 * | 8/2008 | Malladi | H04L 1/1607 370/335 |
| 2008/0219236 | A1 * | 9/2008 | Love | H04L 5/0007 370/347 |
| 2008/0268860 | A1 * | 10/2008 | Lunttila | H04L 1/1887 455/450 |
| 2008/0318608 | A1 * | 12/2008 | Inoue | H04B 1/707 455/509 |
| 2009/0042615 | A1 * | 2/2009 | Teo | H04B 7/0691 455/562.1 |
| 2009/0046691 | A1 * | 2/2009 | Karjalainen | H04L 5/0021 370/342 |
| 2009/0103482 | A1 * | 4/2009 | Imamura | H04L 5/0055 370/329 |
| 2009/0109906 | A1 * | 4/2009 | Love | H04L 1/0026 370/329 |
| 2009/0245198 | A1 * | 10/2009 | Tiirola | H04L 1/18 370/330 |
| 2009/0303978 | A1 * | 12/2009 | Pajukoski | H04L 5/0053 370/345 |
| 2010/0173639 | A1 * | 7/2010 | Li | H04B 7/0695 455/450 |
| 2010/0238877 | A1 * | 9/2010 | Nam | H04L 5/0048 370/329 |
| 2010/0296465 | A1 * | 11/2010 | Hooli | H04J 11/00 370/329 |
| 2014/0204888 | A1 * | 7/2014 | Chung | H03M 13/09 370/329 |

FOREIGN PATENT DOCUMENTS

| | | | |
|---|---|---|---|
| EP | 1865733 | A1 | 12/2007 |
| WO | 2006/109439 | A1 | 10/2006 |

OTHER PUBLICATIONS

Texas Instruments "Comparison of Proposed Uplink Pilot Structures for SC-OFDMA", 3GPP TSG RAN WG1#44bis, document R1-060925, Mar. 27-31, 2006.*

Panasonic, NTT DoCoMo "Narrow Band Uplink Reference Signal Sequences and Allocation for E-UTRA", TSG-RAN WG1 Meeting #47, document R1-063183, Nov. 6-10, 2006.*

NTT DoCoMo, Fujitsu, Mitsubishi Electric, NEC, Panasonic, Sharp "Necessity of Multiple Bandwidths for Sounding Reference Signals", 3GPP TSG RAN WG1 Meeting #47bis, document R1-070090, Jan. 15-19, 2007.*

Motorola "Multiplexing of UL L1/L2 Control Signals in the Absence of Data", 3GPP TSG RAN1#48, document R1-070782, Feb. 12-16, 2007.*

Qualcomm Europe "Link Analysis and Multiplexing Capability for UL ACK", 3GPP TSG RAN WG1 #48bis, document R1-071293, Mar. 26-30, 2007.*

3GPP 3rd Generation Partnership Project; Technical Specification Group Radio Access Network; Evolved Universal Terrestrial Radio Access (E-UTRA); Physical Channels and Modulation (Release 8), 3GPP TS 36.211 V8.3.0, May 2008.*

Texas Instrument. "On Allocation of Uplink Pilot Sub-Channels in EUTRA SC-FDMA." 3GPP, TSG-RAN WG1 Meeting Ad Hoc LTE, No. R1-50822, Aug. 29, 2005, 7 pages.

International Search Report for PCT/EP2008/064125, mailed Dec. 4, 2008.

* cited by examiner

200

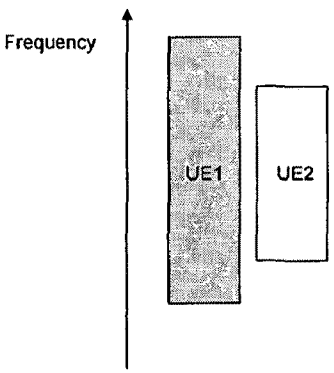
Fig. 5a
Multi-user MIMO arrangement with equal bandwidth allocation
Fig. 5b
Multi-user MIMO arrangement with different bandwidth allocation
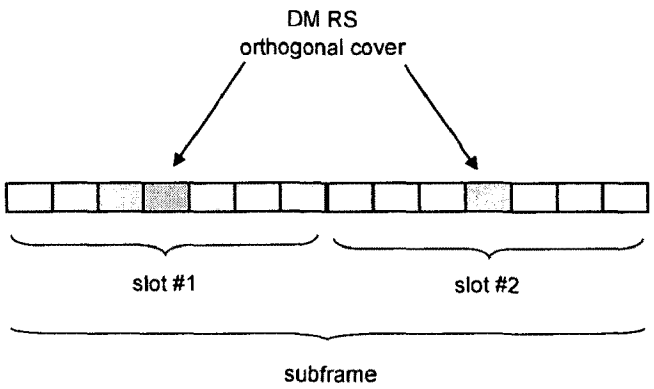
Fig. 6
Orthogonal cover applied for DM RS of MU-MIMO users

METHODS, APPARATUSES, SYSTEM, AND RELATED COMPUTER PROGRAM PRODUCT FOR RESOURCE ALLOCATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is the U.S. national stage of International Application No. PCT/EP2008/064125, filed Oct. 20, 2008 and claims the benefit thereof. The International Application claims the benefits of European Application No. 07119645 filed on Oct. 30, 2007, both applications are incorporated by reference herein in their entirety.

BACKGROUND

What is described below relates to resource allocation, e.g., in arrangements for Multi-BW (bandwidth) MU (multi-user) MIMO (multiple input multiple output) in an UL (Uplink) transmission. More specifically, methods, apparatuses, a system and a related computer program product for resource allocation, e.g., in virtual MIMO and SDMA (spatial division multiple access) are described and a situation in which, e.g., more than one UE (user equipment) can reuse the same physical resources (such as frequency and time), e.g., for UL transmission.

SUMMARY

In 3GPP LTE (3$^{rd}$ Generation Partnership Project Long Term Evolution), there have been discussions related to resource allocation.

A rank (to be described herein below with reference to FIG. 1) of a MIMO transmission is upper bounded, e.g., by the number of receive antennas available at a receiver. However, the separation and reliable detection of signals transmitted becomes frequently difficult when the MIMO transmission rank is equal to the number of receiver antennas. As a result, advanced and complex receivers are needed or achievable throughput gain from the MIMO is reduced.

For example, the gain from 2×2 (2 senders, 2 receivers) MU MIMO is expected to be quite modest, e.g., in a LTE UL, while 2×4 (2 senders, 4 receivers) MU-MIMO can provide significant improvement.

DM RSs (Demodulation reference signals) need to have very low cross-correlation in MIMO transmission. Currently, in the LTE UL, zero-autocorrelation codes are used as reference signals. Hence, different cyclic shifts of a reference signal can be used as orthogonal reference signals in MU-MIMO. However, orthogonality between the reference signals is lost if the transmissions involved in MU-MIMO have different bandwidth (e.g., a number of PRBs (physical resource blocks) exists).

It should be noted that UE pairing in MU-MIMO transmission in practice may require channel information that is still valid at the time of transmission. Thus, the MU-MIMO transmission is limited to cases with relatively low Doppler frequency. In such case, there is no need for frequency hopping between slots.

There have been approaches for overcoming the above limitations. However, currently the adjustment of the MIMO transmission rank is done by changing the number of UEs paired. In case of 2 receiver antennas, this means selection between MU-MIMO and normal SIMO transmissions.

One such approach is directed to multi-user MIMO with multiple bandwidths. Furthermore, this approach proposes also several demodulation reference signal arrangements for MU-MIMO transmissions with multiple bandwidths. However, this approach is solely concerned with avoiding scheduling restrictions due to the requirement of the same bandwidth among MU-MIMO transmissions.

In consideration of the above, an aspect is to overcome one or more of the above drawbacks using methods, apparatuses, a system and a related computer program product for resource allocation.

A method in accordance with at least one or all of the embodiments has respective demodulation reference signals (DM RS) of the same user bandwidth cyclically shifted with respect to each other.

At least some of respective demodulation reference signals of the at least two user bandwidths may be mutually orthogonal.

Respective demodulation reference signals can be mutually orthogonal based on one or both of an orthogonal cover code and a resource block-wise spreading code.

A method in accordance with at least one of the embodiments may include generating (S1) resource block allocation for at least two terminals in such a manner that a resource block allocation for one of the at least two terminals is different from the resource block allocation for another one of the at least two terminals; and sending (S2) the resource blocks generated.

Some or more of the terminals may have at least two user bandwidths and the resource blocks may designate at least one of the user bandwidths, wherein different terminals can have the same or different bandwidth allocation.

Resource block allocations being mutually different may constitute a fractional rank which can be adjusted according to at least one current channel used by the at least two terminals.

The orthogonal cover code and a resource block-wise spreading code may be constituted by one of a Walsh-Hadamard code and a discrete Fourier transform (DFT) code. The number of the orthogonal demodulation reference signals having different overlapping bandwidth allocation can be equal to or smaller than the number of demodulation reference signal blocks in a transmission time interval. The respective demodulation reference signals can be mutually orthogonal based on interleaved frequency division multiple access (IFDMA).

The number of the demodulation reference signals may be equal to the applied repetition factor (RPF).

The sending may include an uplink scheduling grant.

Uplink scheduling grant may be provided in a radio resource control message, and may include a cyclic shift and the orthogonal cover code.

Uplink scheduling grant may be provided in a radio resource control message, and may include a cyclic shift and an orthogonal comb position. In another embodiment, a usage orthogonal cover or IFDM component may be tied statically into DM RS resources.

An embodiment may further include receiving respective allocation requests from the at least two terminals indicating required resources for an intended uplink transmission of the at least two terminals.

An apparatus in accordance with at least one of the embodiments may provide for generating (2025) resource blocks for at least two terminals configured such that a resource block allocation for one of the at least two terminals is different from the resource block allocation for another one of the at least two terminals; and for sending (2023) the resource blocks generated.

Each of the at least two terminals may be configured for at least two user bandwidths and the generating is configured such that the resource blocks designate at least one of the user bandwidths. The generating may be configured such that resource block allocations being mutually different constitute a fractional rank. The generating may be configured to adjust the fractional rank according to at least one current channel used by the at least two terminals.

In accordance with at least one of the embodiments, an apparatus may provide for generating and for sending which may be configured to cyclically shift respective demodulation reference signals (DM RS) of the same user bandwidth with respect to each other. The generating and the sending may be configured to operate based on respective demodulation reference signals of the at least two user bandwidths being mutually orthogonal.

The respective demodulation reference signals are mutually orthogonal based on one of an orthogonal cover code and a resource block-wise spreading code.

The orthogonal cover code and a resource block-wise spreading code may, e.g., be constituted by one of a Walsh-Hadamard code and a discrete Fourier transform (DFT) code.

The number of the demodulation reference signals may be equal to or smaller than the number of demodulation reference signal blocks in a transmission time interval.

Respective demodulation reference signals may be mutually orthogonal based on interleaved frequency division multiple access (IFDMA). The number of the demodulation reference signals can be equal to the applied repetition factor (RPF). The sending is optionally configured to send an uplink scheduling grant.

The uplink scheduling grant may include an index for DM RS resource having a cyclic shift and the orthogonal cover code (or IFDM comb) wherein a usage orthogonal cover (or IFDM comb) is configured using radio resource control message.

The uplink scheduling grant may include an index for DM RS resource having a cyclic shift and the orthogonal cover code (or IFDM comb) wherein a usage orthogonal cover (or IFDM component) is tied statically into DM RS resources.

The apparatus may further provide for receiving (2024) respective allocation requests from the at least two terminals indicating required resources for an intended uplink transmission of the at least two terminals.

In accordance with at least one of the embodiments, a method may include receiving (S3) resource blocks generated in such a manner that the resource block allocation for one of the at least two terminals is different from the resource block allocation for another one of the at least two terminals; and allocating (S4) the resource blocks for the one of the at least two terminals.

In accordance with at least one of the embodiments, an apparatus may provide at least one of: generating configured to cyclically shift respective demodulation reference signals (DM RS) of a user bandwidth with respect to each other, receiving (2014) resource blocks generated in such a manner that the resource block allocation for one of the at least two terminals is different from the resource block allocation for another one of the at least two terminals; and allocating (2015) the resource blocks for the one of the at least two terminals.

The apparatus may be capable of performing multi bandwidth multi-user multiple input multiple output.

The terminals may be constituted by user equipments.

The apparatus may optionally be constituted by one or more of a base station, a radio resource controller, a user equipment, a chipset and module.

A system may include one or more of the apparatuses described above.

A computer program product may include program code for performing one or more of the methods steps of a method as described above, when run on a computer.

In this connection, it has to be pointed out that the methods described herein enable one or more of the following:

- Efficiently utilizing multi-bandwidth transmission in MIMO;
- Providing an arrangement of orthogonal UL reference signals for multi-bandwidth multi-user MIMO;
- Providing a solution for DM RS in more than one slot;
- Easy adjustment of the MU-MIMO transmission rank with finer granularity;
- Enabling adjustment of the rank of MIMO transmission according to the current channels of UEs paired for MU-MIMO.
- Enabling a better adaptation of MU-MIMO transmission to the current channel conditions;
- Simple implementation of the proposed DM RS arrangement;
- Improving channel estimation accuracy

BRIEF DESCRIPTION OF THE DRAWINGS

These and other aspects and advantages will become more apparent and more readily appreciated from the following description of the exemplary embodiments, taken in conjunction with the accompanying drawings of which:

FIGS. 5a, 5b are transmission diagram of a Multi-user MIMO arrangement with equal bandwidth allocation (FIG. 5a) and different bandwidth allocation (FIG. 5b); and FIG. 6 is a subframe diagram for an embodiment of orthogonal cover applied for DM RS of MU-MIMO users.

DETAILED DESCRIPTION OF THE PREFERRED EMBODIMENT

Figure 1A:
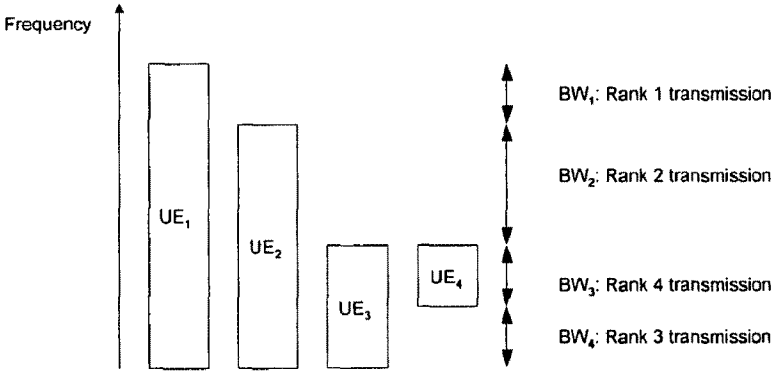
FIG. 1A is transmission diagram of a first example of a multi-BW multi-user MIMO arrangement providing a MIMO transmission with an effectively fractional rank.

Reference will now be made in detail to the preferred embodiments, examples of which are illustrated in the accompanying drawings, wherein like reference numerals refer to like elements throughout.

Embodiments are described herein below by way of example with reference to the accompanying drawings.

It is to be noted that for this description, the terms "physical resource block/user bandwidth and user equipment" are examples for "resource block and terminal", respectively, without restricting the latter-named terms to the special technical or implementation details imposed to the first-named terms.

Figure 1B:
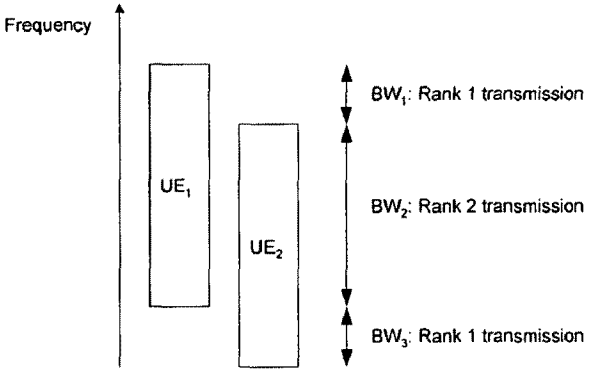
FIG. 1B shows a second example of a multi-BW multi-user MIMO arrangement providing a MIMO transmission with an effectively fractional rank.

FIG. 1A shows a first example of a multi-BW multi-user MIMO arrangement (4 UEs and 4 PRBs/user BWs) providing MIMO transmission with an effectively fractional rank, and FIG. 1B shows a second example of a multi-BW multi-user MIMO arrangement (2 UEs and 3 PRBs/user BWs) providing a MIMO transmission with an effectively fractional rank.

In the arrangement shown in FIGS. 1A and 1B, M (physical) resource blocks (FIG. 1A: M=4, $BW_1$ to $BW_4$; FIG. 1B: M=3, $BW_1$ to $BW_3$) are assigned to UEs (FIG. 1A: 4 UEs; FIG. 1B: 2 UEs) paired for MU-MIMO transmissions, e.g., in the UL transmission. Within those M PRBs, individual resource block allocation is performed for each UE so that the allocation differs from the other allocations within that MU-MIMO transmission. In other words, the PRB/user BW allocation for each individual UE is performed such that no given pair of two UEs is allocated exactly the same PRBs/user BWs.

As shown, e.g., in FIG. 1B, $UE_1$ and $UE_2$ have substantially the same need for communication resources. However, in order to guarantee different PRB allocation, allocation is performed such that $UE_1$ and $UE_2$ are allocated, e.g., $BW_2$ in common, but $BW_1$ is allocated solely to $UE_1$, while $BW_3$ is allocated solely to UE2. The same applies to $UE_1$ to $UE_4$ in FIG. 1A, in which each of UE1 to UE4 mutually differs in at least one allocated PRB/BW from any other UE.

Thus, as shown in FIGS. 1A and 1B, the effective (or average) rank Rankeff of MIMO transmission over M PRBs is fractional, i.e. may be defined to be $$\mathrm{Rank}_{eff} = \frac{\sum_{i=1}^{M} \mathrm{Rank}(\mathrm{PRB}_i)}{\mathrm{M}}$$

According to FIG. 1A, the effective rank $\mathrm{Rank}_{eff}$ would be (1+2+4+3)/4=2.5. According to FIG. 1B, the effective rank $\mathrm{Rank}_{eff}$ would be (1+2+1)/3≈1.3.

Figure 2:
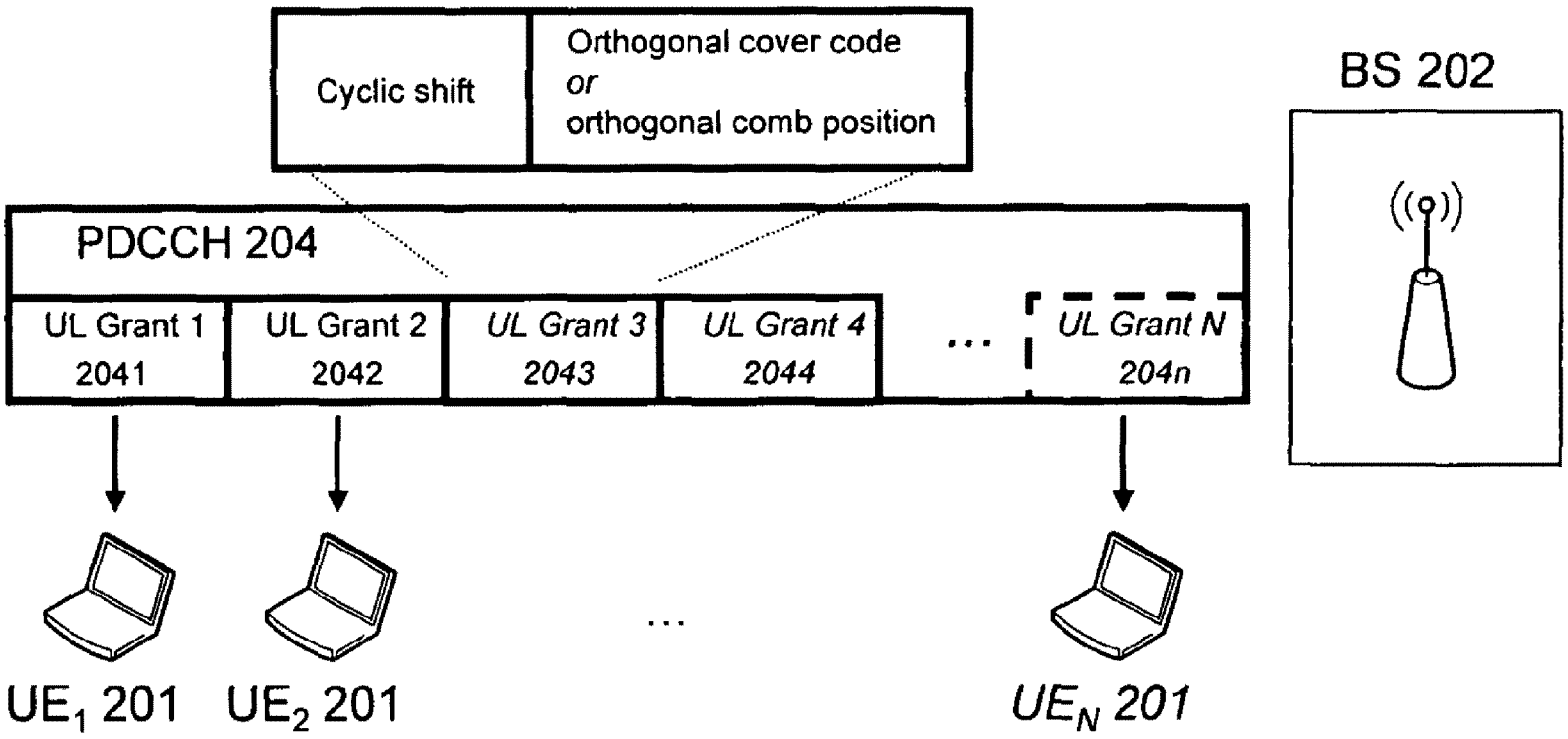
FIG. 2 is block diagram and a data format of an arrangement of a PDCCH (physical DL (downlink) control channel)

FIG. 2 shows an arrangement for a PDCCH (physical downlink control channel) 204. As further shown in FIG. 2, the PDCCH 204 may be used by the BS 202 prior to the UL transmission in order to send, e.g., uplink (scheduling) grants 2041, . . . , 204n to the particular UEs 201, i.e. $UE_1$ to $UE_N$. In other words, during the DL transmission, these UL grants 2041, . . . , 204n may serve for allocating PRBs to the respective UEs 201 ($UE_1$ to $UE_N$) for the subsequent UL transmissions.

As described herein below in greater detail, each UL grant 2041, . . . , 204n may form at least part of an index for a DM RS resource containing a cyclic shift (used, e.g., for mutually separating different DM RSs from UEs in the same PRB/BW) and an orthogonal cover code or an orthogonal comb position (used, e.g., for mutually separating different DM RSs from UEs in different PRBs/BWs). These DM RS resources can be configured using RRC control signaling.

Figure 3:
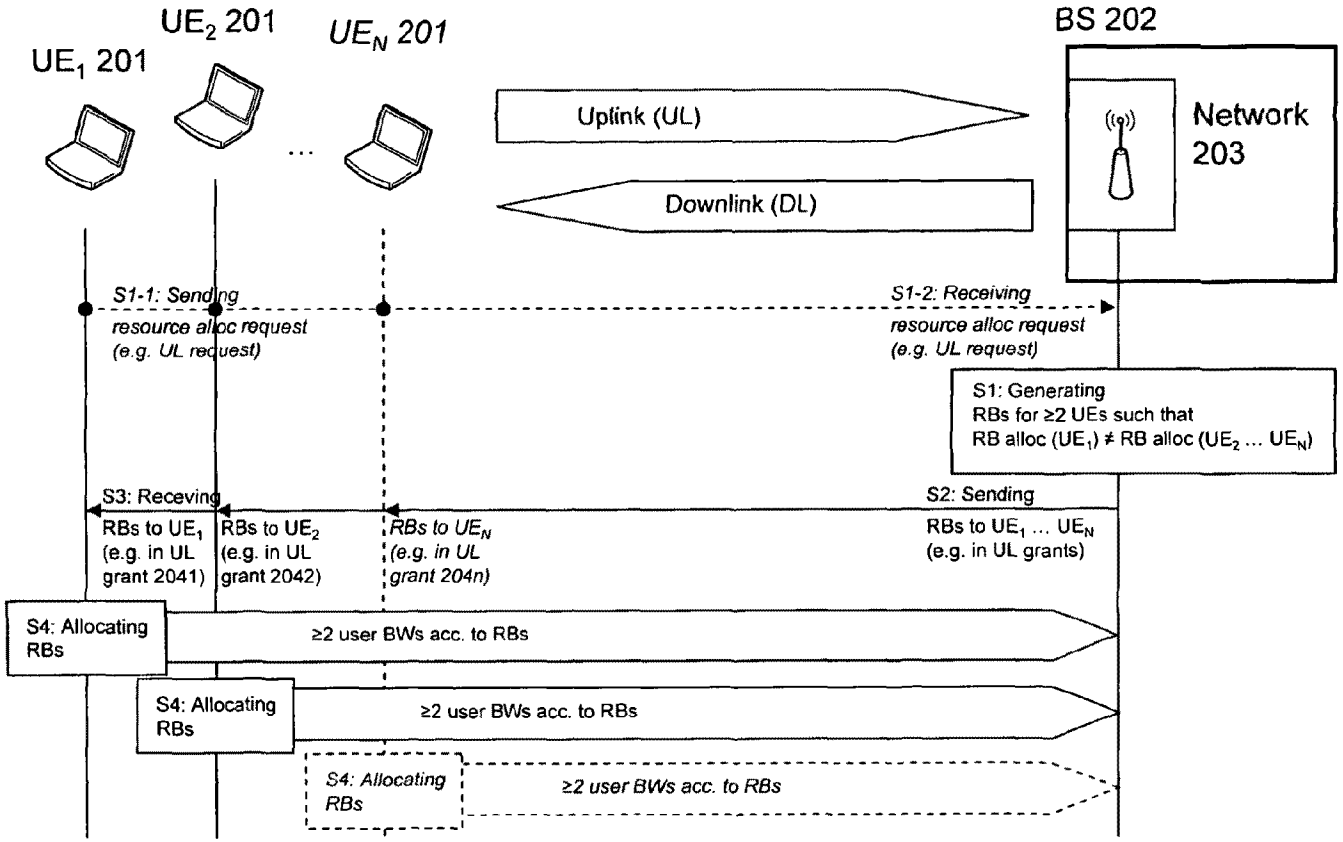
FIG. 3 is a transmission timing diagram illustrating methods for resource allocation.

FIG. 3 shows embodiments of methods. Signaling between elements is indicated in horizontal direction, while time aspects between signaling may be reflected in the vertical arrangement of the signaling sequence as well as in the sequence numbers. It is to be noted that the time aspects indicated in FIG. 3 do not necessarily restrict any part of the method shown to the sequence outlined. This applies in particular to method steps that are functionally disjunctive with each other, for example, if step S4 for allocating at least two PRBs is performed in each UE separately, allocation may be performed in a different order (order shown ranges from $UE_1$ to $UE_N$), substantially simultaneously or simultaneously. The same arbitrariness in order applies to the optional sending step S1-1 and the receiving step S3. Within FIG. 3, for ease of description, portions providing main functionalities are depicted with solid functional blocks or arrows and a normal font, while portions providing optional functions are depicted with dashed functional blocks or arrows and an italic font.

As shown in FIG. 3, a communication system 200 may include at least two UEs 201 ($UE_1$ to $UE_N$) and a network 203. The network 203 in turn may include the BS/RNC (abbreviated as "BS" hereinafter) 202. The BS 202 may also be disposed as an integral entity with, e.g., a gateway entity not shown, or may be connected to the gateway entity not shown.

As an optional preparatory measure, in step S1-1, e.g., the UEs 201 may perform sending, to the BS 202, respective resource allocation requests (e.g., UL requests). In optional step S1-2, e.g., the BS 202 may perform receiving the respective allocation requests (e.g., UL requests) from the at least two terminals (e.g., $UE_1$ to $UE_N$) indicating required resources for an intended UL transmission of the at least two terminals.

In step S1, e.g., the BS 202 may perform generating RBs (resource blocks) for at least two terminals in such a manner that a resource block (e.g., PRB) allocation for one of the at least two terminals (e.g., $UE_1$) is different from the resource block allocation for another one of the at least two terminals (e.g., $UE_2$), as shown and described in conjunction with FIG. 1.

In step S2, e.g., the BS 202 may perform sending the resource blocks generated. And, in step S3, e.g., at least two the UEs 201 may perform receiving the resource blocks.

Then, in step S4, e.g., at least two of the UEs 201 may perform allocating the resource blocks for the one (e.g., $UE_1$) of the at least two terminals (e.g., $UE_1$ to $UE_N$).

According to further refinements of the methods relating, e.g., to the BS 202 or UEs 201, each of the at least two terminals (e.g., $UE_1$ to $UE_N$) may have at least two user bandwidths (e.g., $BW_1$ to $BW_M$, see FIG. 1) and the resource blocks designate at least one of the user bandwidths.

Furthermore, the resource block allocations being mutually different may constitute a fractional rank, as described herein above in conjunction with FIG. 1. In addition, the fractional rank may be adjusted according to at least one current channel (or user BW) used by the at least two terminals.

Furthermore, respective DM RSs of the same user BW may be cyclically shifted with respect to each other. For example, when usage of orthogonal DM RSs is indicated, e.g., in a UL grant, e.g., j bits in the UL grant (on PDCCH) may indicate up to $2^j$ cyclic shifts per sequence (j being an integer greater than zero).

Moreover, respective DM RSs of the at least two user bandwidths (e.g., $BW_1$ to $BW_M$) may be mutually orthogonal. Especially, the respective DM RSs may be mutually orthogonal based on an orthogonal cover code or a resource blockwise spreading code, wherein those codes may be constituted by a Walsh-Hadamard code or a discrete Fourier transform (DFT) code.

In other words, orthogonal DM RSs may be generated using different cyclic shifts and different orthogonal cover codes, e.g., of length 2 ([1, 1], [1, −1]), if M=2. It should be noted that there is no need to 'turn off' the orthogonal cover code even if these codes not utilized. Hence, alternatively, a particular DM RS resource could always mean the use of certain orthogonal cover code. In such case, no additional RRC signaling is required, and the used orthogonal cover code could be defined, e.g., by:

Orthogonal DM RSs corresponding to resource numbers [0, 1, 2, 3] (or BW1 and BW2, see FIG. 1B) may utilize orthogonal cover code, e.g., of [1,1].

Orthogonal DM RSs corresponding to resource numbers [4, 5, 6, 7] (or BW3 and BW4, see FIG. 1B) may utilize orthogonal cover code of [1,−1].

In addition to the above, the number of the DM RSs may be equal to or smaller than the number of demodulation reference signal blocks, e.g., in a transmission time interval.

Alternatively to the above orthogonality considerations, the respective DM RSs may also be mutually orthogonal, e.g., based on interleaved frequency division multiple access (IF-DMA). In this case, the number of DM RSs may be equal to the applied repetition factor (RPF).

In addition to the above, the sending may include an uplink scheduling grant. In other words, in case of usage of multiple orthogonal DM RSs, e.g., within a cell, the at least two UEs may be informed, as part of the UL grant, which orthogonal DM RS to use, e.g., in the first slot. DM RS resources corresponding to the second slot may be based on DM RS resources of first slot and some pre-defined DM RS hopping pattern. In this case, the UL (scheduling) grant may be provided in a radio resource control message. Furthermore, the UL grant may include a cyclic shift and an orthogonal comb position, if IFDMA is used, or an orthogonal cover code, if IFDMA is not used.

Figure 4:
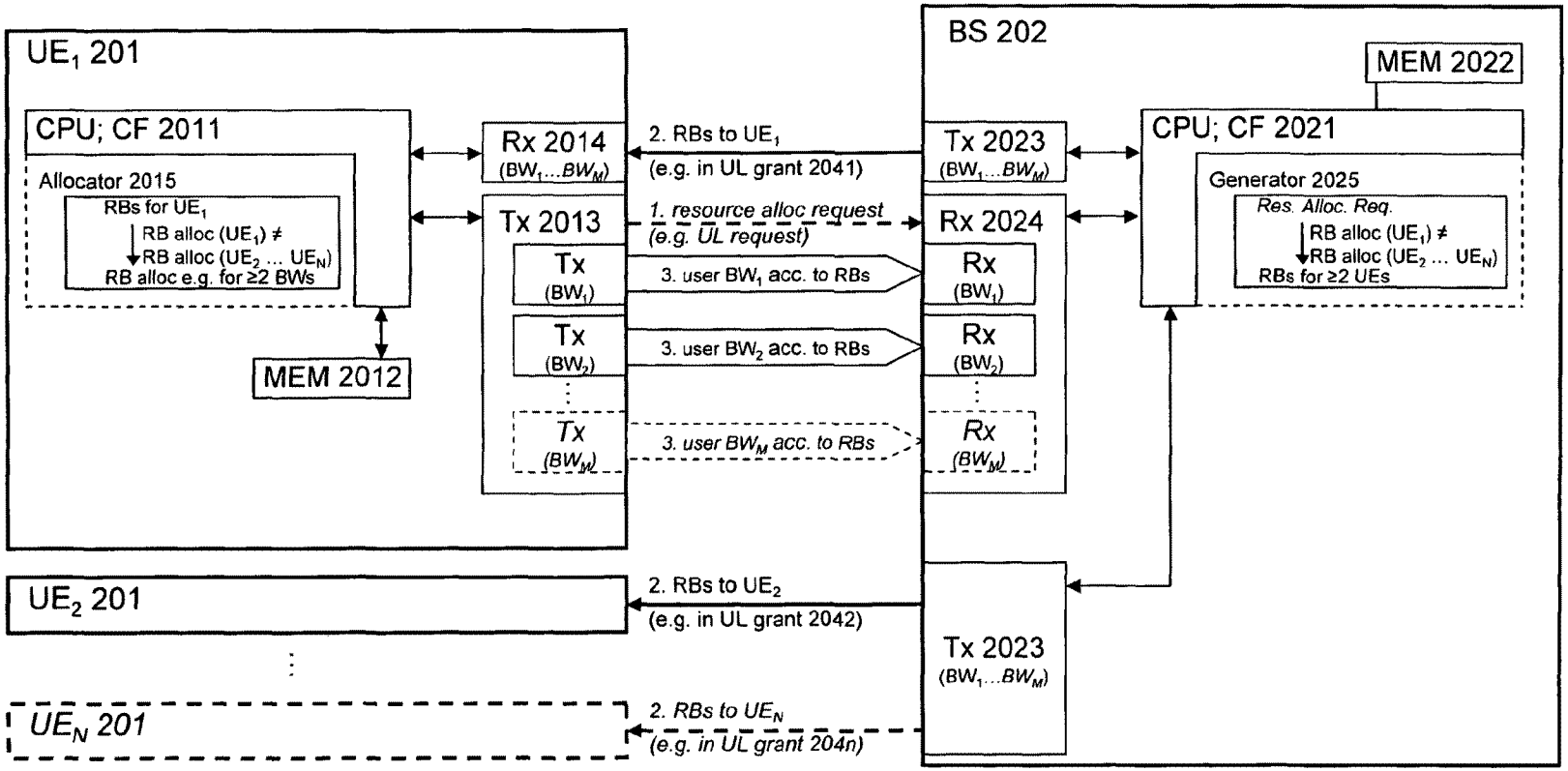
FIG. 4 is a block diagram of respective apparatuses (e.g., UEs and BS/RNC (base station/radio network controller)) for resource allocation.

FIG. 4 shows embodiments of respective apparatuses (e.g., UEs 201 and BS/RNC 202) for resource allocation. Within FIG. 4, for ease of description, portions providing main functionalities are depicted with solid functional blocks or arrows and a normal font, while portions providing optional functions are depicted with dashed functional blocks or arrows and an italic font.

Each of the UEs 201 may have a CPU or core functionality CF (referred to as "CPU" hereinafter) 2011, a memory 2012, a sender (or means for sending) Tx 2013, a receiver (or means for receiving) Rx 2014 and an allocator (or means for allocating) 2015. For ease of description, this full configuration is only shown for $UE_1$. The BS 202 may include a CPU 2021, a memory 2022, a sender (or means for sending) Tx 2023, a receiver (or means for receiving) Rx 2024 and a generator (or means for generating) 2025. As indicated by the dashed extensions of the functional blocks of the CPUs 2011 and 2021, the means for allocating 2015 of the UEs 201 and/or the means for generating 2025 of the BS 202 may be functionalities running on the CPUs 2011 and/or 2021 or may alternatively be separate functional entities or means.

The CPUs 20x1 (wherein x=1 and 2) may respectively be configured to process various data inputs and to control the functions of the memories 20x2, the senders 202x3 and the receivers 20x4 (and the means for allocating 2015 of the UEs 201 as well as the means for generating 2025 of the BS 202). The memories 20x2 may respectively serve, e.g., for storing code means for carrying out, e.g., the respective method, when run on the CPUs 20x1. It is to be noted that the senders 20x3 and the receivers 20x4 may also be capable of sending/receiving in at least two frequency bandwidths (denoted $BW_1$, $BW_2$, $BW_M$). Furthermore, it is to be noted that the senders 20x3 and the receivers 20x4 may alternatively be provided as respective integral transceivers (not shown). It is further to be noted that the senders/receivers may be implemented i) as physical senders/receivers for transceiving, e.g., via the air interface (e.g., in case of UE 201 towards the BS 202), or ii) as routing entities, e.g., for sending/receiving data packets, e.g., in a PS network (e.g., between the BS 202 and a gateway not shown when the BS 202 and the gateway are disposed as separate network entities), or iii) as functionalities for writing/reading information into/from a given memory area (e.g., in case of shared/common CPUs or memories, e.g., of BS 202 and the gateway not shown when the BS 202 and the gateway not shown are disposed as an integral network entity), or iv) as any suitable combination of i) to iii).

Optionally, the means for sending 2013 of the at least two UEs 201 may be configured to send receive respective allocation requests (e.g., UL requests) from the at least two terminals (e.g., $UE_1$ to $UE_N$ 201) indicating required resources for an intended UL transmission of those at least two terminals. Consequently, the means for receiving 2024 of the BS 202 may optionally be configured to receive these respective allocation requests (e.g., UL requests) from the at least two terminals (e.g., $UE_1$ to $UE_N$ 201).

Then, e.g., the means for generating 2025 of the BS 202 may be configured such that resource blocks for at least two terminals (e.g., $UE_1$ to $UE_N$ 201) are generated in such a manner that a resource block allocation (see, e.g., FIG. 1A, PRB allocation for $UE_1$) for one of the at least two terminals (e.g., $UE_1$) is different from the resource block allocation (see, e.g., FIG. 1A, PRB allocation any one of $UE_2$ to $UE_4$) for another one of the at least two terminals (e.g., $UE_2$ to $UE_4$).

And, the means for sending 2023 of the BS 202 may be configured to send the resource blocks generated by the means for generating 2025.

Then, e.g., the means for receiving 2014 of the at least two UEs 201 may be configured to receive these resource blocks.

And, the means for allocating 2015 of the at least two UEs 201 may be configured to allocate the resource blocks for the one (e.g., each individual one of $UE_1$ to $UE_N$ 201) of the at least two terminals.

According to further refinements of the apparatuses (e.g., BS 202 and/or UEs 201), each of the at least two terminals (e.g., $UE_1$ to $UE_N$) may be configured for at least two user bandwidths (e.g., $BW_1$ to $BW_M$, see FIG. 1) and the resource blocks designate at least one of the user bandwidths.

Furthermore, the means for generating 2025 of the BS 202 may be configured such that the resource block allocations being mutually different may constitute a fractional rank, as described herein above in conjunction with FIGS. 1 and 3. In addition, the means for generating 2025 of the BS 202 may be further configured to adjust the fractional rank according to at least one current channel (or user BW) used by the at least two terminals.

Furthermore, e.g., the means for generating 2025 and the means for sending 2023 of the BS 202 may be configured to cyclically shift respective DM RSs of the same user BW with respect to each other. For example, when usage of orthogonal DM RSs is indicated, e.g., in a UL grant, e.g., j bits in the UL grant (on PDCCH, see FIG. 2) may indicate up to $2^j$ cyclic shifts per sequence (j being an integer greater than zero).

Moreover, the means for generating 2025 and the means for sending 2023 may be configured to operate based one respective demodulation reference signals of the at least two user bandwidths (e.g., $BW_1$ to $BW_M$) being mutually orthogonal. Especially, the respective DM RSs may be mutually orthogonal based on an orthogonal cover code or a resource block-wise spreading code, wherein those codes may be constituted by a Walsh-Hadamard code or a discrete Fourier transform (DFT) code.

In other words, the means for generating may be configured to generate orthogonal DM RSs using different cyclic shifts and different orthogonal cover codes, e.g., of length 2 ([1, 1], [1, −1]), if M=2. It should be noted that there is no need to 'turn off' orthogonal cover code even if these codes not utilized. Hence, alternatively, a particular DM RS resource could always mean the use of certain orthogonal cover code. In such case, no additional RRC signaling may be required, and the used orthogonal cover code could be defined, e.g., by:

Orthogonal DM RSs corresponding to resource numbers [0, 1, 2, 3] (or BW1 and BW2, see FIG. 1B) may utilize orthogonal cover code, e.g., of [1,1].

Orthogonal DM RSs corresponding to resource numbers [4, 5, 6, 7] (or BW3 and BW4, see FIG. 1B) may utilize orthogonal cover code of [1,−1].

In addition to the above, the number of the DM RSs may be equal to or smaller than the number of demodulation reference signal blocks, e.g., in a transmission time interval.

Alternatively to the above orthogonality considerations, the respective DM RSs may also be mutually orthogonal, e.g., based on interleaved frequency division multiple access (IFDMA). In this case, the number of DM RSs may be equal to the applied repetition factor (RPF).

In addition to the above, the means for sending 2023 of the BS 202 may be configured to send an uplink (scheduling) grant. In other words, in case of usage of multiple orthogonal DM RSs, e.g., within a cell, the at least two UEs may be informed, as part of the UL grant, which orthogonal DM RS to use, e.g., in the first slot. In this case, the UL grant may be in a radio resource control message. Furthermore, the UL grant may include a cyclic shift and an orthogonal comb position, if IFDMA is used, or an orthogonal cover code, if IFDMA is not used.

Furthermore, each of the UEs 201 and/or the BS 202, or the respective functionalities carried out, may be implemented as a chipset or module.

Finally, a system may include at least two UEs 201 and a BS 202.

Without being restricted to the details following in this section, an embodiment may be summarized as follows:

An arrangement of orthogonal reference signals for multi-bandwidth MU-MIMO UEs on top of LTE Release 8 signaling is provided.

An efficient MIMO transmission arrangement is provided.

MIMO transmission arrangement that has effectively a fractional rank is proposed. The arrangement is illustrated, e.g., in FIG. 1. In the arrangement, M resource blocks are assigned to UEs paired for MU-MIMO transmissions. Within M PRBs, individual resource block allocation is allocated for each UE so that the allocation differs from the other allocations within that MU-MIMO transmission.

As seen from FIG. 1, the effective or average rank of MIMO transmission over M PRBs is fractional.

This fractional rank can be adjusted according to the current channels of the paired UEs so that signals can be successfully received. In other words, effective MIMO rank is matched with the receiver/detection capability in current channels.

Optimized multi-bandwidth MU-MIMO transmission requires that DM RS with different bandwidths are orthogonal. Orthogonality is obtained by applying orthogonal cover code/block-wise spreading code over the DM RS blocks within TTI. Such code can be, e.g., Walsh-Hadamard code or DFT code. The number of different bandwidths for which DM RS can be orthogonally multiplexed is given by the number of DM RS blocks in TTI. Alternatively, it is possible to obtain orthogonal DM RSs with different bandwidths by IFDMA. In case of IFDMA, the number orthogonal reference signals with different bandwidths correspond to the applied repetition factor (RPF). Reference signals for the UEs with the same bandwidth may also use the same orthogonal cover code but different cyclic shift (i.e. equivalent to previous solution).

The dynamic selection of used orthogonal cover (used orthogonal comb in case of IFDMA) can be signaled to UE in the UL scheduling grant. For example, in the case of LTE release 8, RRC message is sent to UE indicating a set of cyclic shifts, orthogonal cover codes or orthogonal comb positions that are allowed to be used by the UE to differentiate demodulation reference signals in MU-MIMO transmissions. UL scheduling grant can then dynamically indicate the current selection of cyclic shift, orthogonal cover code or orthogonal comb position from the set defined by the RRC message.

Arrangement of multi-bandwidth MU-MIMO can be implemented with a scheduler. At the receiver, linear FDE (frequency domain equalizer) may be used in case of FIG. 1b. Alternatively, a receiver with interference cancellation (iterative or non-iterative) is applied; e.g., the signal with lowest effective MIMO rank may be detected and cancelled first.

Implementation of proposed DM RS requires DM RS multiplication with orthogonal cover code as well as introduction of RRC message selecting between the used cyclic shifts, orthogonal cover code or orthogonal comb position. An exemplary orthogonal DM RS assignment protocol could be described by:

The possible use of multiple orthogonal DM RSs within a cell is supported,

In case of multiple orthogonal DM RSs within a cell, the UE is informed as part of the UL grant which orthogonal DM RS to use in the first slot, When Orthogonal DM RSs is indicated in the UL grant, 3 bits in the UL grant (on PDCCH) indicate up to 8 cyclic shifts per sequence, Orthogonal DM RSs are generated using different cyclic shifts and different orthogonal covers codes of length 2 ([1, 1], [1, −1]).

It should be noted that there is no need to 'turn off' orthogonal cover code even if it is not utilized. Hence, alternatively, a particular DM RS resource could always mean the use of certain orthogonal cover code. In such case, no additional RRC signaling is required, and the used orthogonal cover code could be defined, e.g., by:

Orthogonal DM RSs corresponding to resource numbers [0, 1, 2, 3] utilize always orthogonal cover code of [1,1], Orthogonal DM RSs corresponding to resource numbers [4, 5, 6, 7] utilize always orthogonal cover code of [1,−1].

In accordance with at least one of the embodiments, the uplink scheduling grant may contain an index for orthogonal DM RS resources. These resources can be configured using a radio resource control message, and may include a cyclic shift and the orthogonal cover code.

The UL scheduling grant contains 3-bit information about what is the actual DM RS resource to be used by this particular UE. RRC signalling is used to configure these resources. According to one or more of the embodiments, orthogonal cover code is signalled besides the cyclic shift index for each of the 8 resources.

In another embodiment, the usage orthogonal cover (or IFDM) component is not signalled, but it is tied statically (e.g., by the specification) into specific DM RS resources.

Further Embodiments

For the purpose described herein above, it should be noted that

- for descriptive purposes, DM reference signal arrangements are described in particular in context with 3GPP LTE release 9 and, e.g., LTE release 8. However, in general, the principles may be applied to MIMO transmission in any system that uses OFDMA (orthogonal frequency division multiple access) or SC-FDMA (single carrier frequency division multiple Access).
- an access technology may be any technology by which a user equipment can access an access network (or base station, respectively). Any present or future technology, such as WiMAX (Worldwide Interoperability for Microwave Access) or WLAN (Wireless Local Access Network), BlueTooth, Infrared, and the like may be used; although the above technologies are mostly wireless access technologies, e.g., in different radio spectra, access technology may also imply wirebound technologies, e.g., IP based access technologies like cable networks or fixed line.
- a network may be any device, unit or means by which a station entity or other user equipment may connect to and/or utilize services offered by the access network; such services include, among others, data and/or (audio-) visual communication, data download etc.;
- generally, the method(s) may be applicable in those network/user equipment environments relying on a data packet based transmission scheme according to which data are transmitted in data packets and which are, for example, based on the Internet Protocol IR. The methods are, however, not limited thereto, and any other present or future IP or mobile IP (MIP) version, or, more generally, a protocol following similar principles as (M)IPv4/6, is also applicable;
- a user equipment may be any device, unit or means by which a system user may experience services from an access network;
- method steps likely to be implemented as software code portions and being run using a processor at the network element, are software code independent and can be specified using any known or future developed programming language as long as the functionality defined by the method steps is preserved;
- generally, any method step is suitable to be implemented as software or by hardware without changing the idea in terms of the functionality implemented;
- method steps and/or devices, units or means likely to be implemented as hardware components at the UEs and/or the BS, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable, e.g., of authentication, authorization, keying and/or traffic protection;
- devices, units or means (e.g., UEs and/or BS) can be implemented as individual devices, units or means, but this does not exclude that they are implemented in a distributed fashion throughout the system, as long as the functionality of the device, unit or means is preserved. In the following, a further embodiment of uplink demodulation reference signal, UL DM RS, for Multi-bandwidth Multi-user Multiple input multiple output, MIMO, will be described.

When cyclic shift is indicated dynamically, 3 bits in the UL grant (on PDCCH) may indicate up to 8 cyclic shifts per sequence. The motivation for using multiple cyclic shifts within a cell is related to the Multi-user MIMO operation.

The described embodiment may be used as such or in combination with at least one or more of the above described embodiments and provides an improvement for MU-MIMO operation providing decreased cross-correlation properties between reference signals of different MU-MIMO users.

There are two different situations between different MU-MIMO users, one with equal bandwidth allocation shown in FIG. 5a), and another with non-equal bandwidth allocation shown in FIG. 5b). The existing cyclic shift separation works fine in case of equal bandwidth allocation as shown in FIG. 5a). However, the orthogonality between the reference signals is lost if the transmissions involved in MU-MIMO have different transmission bandwidth.

In the current situation, demodulation reference signals need to have very low cross-correlation in MU-MIMO transmission. In the LTE UL, zero-autocorrelation codes are used as reference signals. Hence, different cyclic shifts of a reference signal can be used as orthogonal reference signals in MU-MIMO. However, as discussed above, orthogonality between the reference signals is lost if the transmissions involved in MU-MIMO have different bandwidth (i.e. number of physical resource blocks, PRB).

For multi-user MIMO with multiple bandwidths several demodulation reference signal, DM RS, arrangements for MU-MIMO transmissions with multiple bandwidths can be provided so as to avoid scheduling restrictions due to the requirement of the same bandwidth among MU-MIMO transmissions.

A problem may be that that solution involves DM RS in only one slot. Further DM RS are not fully orthogonal, and spectral density of DM RS is unnecessarily reduced at least for one UE involved in MU-MIMO. This deteriorates in turn channel estimation performance.

It should be noted that UE pairing in MU-MIMO transmission in practice requires channel information that is still valid at the time of transmission. Thus the MU-MIMO transmission is limited to cases with relatively low Doppler frequency. In such case, there is no need for frequency hopping between slots.

This embodiment provides a scheme as follows. Optimized multi-bandwidth MU-MIMO transmission requires that DM RS with different bandwidths are orthogonal. Orthogonality can be obtained by applying orthogonal cover code over the DM RS blocks within TTI, as shown in FIG. 6. In this embodiment, orthogonal cover is applied for DM RS of MU-MIMO users. Walsh-Hadamard codes may be applied as orthogonal cover codes. Other codes may also be used. FIG. 6 shows slots #1, #2 of a subframe. The DM RS is provided at the same position of the slots such as in the middle or the respective fourth block of the slots.

The number of different bandwidths for which DM RS can be orthogonally multiplexed is two. Reference signals for the UEs with the same bandwidth can also use the same orthogonal cover code but different cyclic shift. At the UE side, the proposed scheme requires DM RS multiplication with orthogonal cover code.

Additional cover codes can be used on top of existing cyclically shifted DM RS. This means that cross-correlation properties between the reference signals can be improved without any degradation on the existing cross correlation properties.

The proposed DM RS arrangement of this and other embodiments is simple to implement and allows for orthogonal DM RS between multi-bandwidth MU-MIMO transmissions. This improves channel estimation accuracy. There are no disadvantages on the use of orthogonal cover code: the use of MU-MIMO is naturally limited to sufficiently low Doppler frequencies so that the cover codes remain orthogonal in practice.

The dynamic selection of used orthogonal cover is signaled to UE in the UL scheduling grant. For example in RRC message is sent to UE indicating a set of cyclic shifts and orthogonal cover codes that are allowed to be used by the UE to differentiate demodulation reference signals in MU-MIMO transmissions. UL scheduling grant can then dynamically indicate the selected pair of cyclic shift and orthogonal cover code from the set defined by the RRC message. An exemplary orthogonal DM RS assignment protocol can be described by at least one of or more or all of the following:

The possible use of multiple orthogonal DM RSs within a cell is supported;

In case of multiple orthogonal DM RSs within a cell, the UE is informed as part of the UL grant which orthogonal DM RS to use in the first slot;

When Orthogonal DM RSs is indicated in the UL grant, 3 bits in the UL grant (on PDCCH) indicate up to 8 orthogonal DM RS resources;

Orthogonal DM RSs are generated using different cyclic shifts and different orthogonal covers codes of length 2 ([1, 1], [1, −1]).

It should noted that there is no need to 'turn off' orthogonal cover code even if it is not utilized. Hence, alternatively, a particular DM RS resource can always mean the use of certain orthogonal cover code. In such case, no additional RRC signaling is required, and the used orthogonal cover code may be defined, e.g., by:

Orthogonal DM RSs corresponding to resource numbers [0, 1, 2, 3] utilize always orthogonal cover code of [1,1];

Orthogonal DM RSs corresponding to resource numbers [4, 5, 6, 7] utilize always orthogonal cover code of [1,−1]

The embodiment provides DM RS allocation with Multi-user MIMO. Orthogonality problems related to DM RS with MU-MIMO UEs having different transmission bandwidth are solved.

There are provided orthogonal cover code over the DM RS blocks within TTI. Walsh-Hadamard codes of [1, 1] and [1, −1] can be applied as orthogonal cover codes in one or more of the embodiments.

Existing dynamic signaling included in UL grant (3 bits) is enough also in case when orthogonal cover code is used between reference signals of different MU-MIMO UEs. Regarding to configuration of these DM RSs, two alternatives exist:

Additional information field in DM RS configuration: Orthogonal cover codes are configured together with orthogonal cyclic shifts;

No additional signalling: particular DM RS resource may always mean the use of certain orthogonal cover code.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

For ease of clearness, the following table provides a survey of the abbreviations used in the above description. It is to be noted that an "s" following an abbreviation represents the plural of that abbreviation, e.g., "UEs" represents "user equipments".

| | |
|---|---|
| 3GPP | 3rd generation partnership project |
| DL | Downlink |
| DM RS | Demodulation Reference Signal |
| FDE | Frequency Domain Equalizer |
| IC | Interference Cancellation |
| IFDMA | Interleaved Frequency-Division Multiple Access |
| LTE | Long Term Evolution |
| MIMO | Multiple-Input Multiple-Output |
| MU-MIMO | Multi-User Multiple-Input Multiple-Output |
| OFDMA | Orthogonal Frequency Division Multiple Access |
| RPF | Repetition Factor |
| RS | Reference Signal |
| SC-FDMA | Single Carrier Frequency Division Multiple Access |
| SDMA | Spatial Division Multiple Access |
| UE | User Equipment |
| UL | Uplink |

The invention claimed is:

1. A method, comprising:

cyclically shifting with respect to each other, demodulation reference signals of one user bandwidth[.]*;* and

*generating resource block allocation for at least two terminals in such a manner that a first resource block allocation for one of the at least two terminals is different from a second resource block allocation for another of the at least two terminals; and*

*sending the resource block allocation generated,* wherein respective demodulation reference signals of at least two user bandwidths are mutually orthogonal based on at least one of an orthogonal cover code and a resource block-wise spreading code,

*wherein different terminals can have either identical or different bandwidth allocation, and*

*wherein each of the at least two terminals has at least two user bandwidths and the resource block allocation designates at least one of the user bandwidths.*

[2. The method according to claim 1, comprising:

generating resource block allocation for at least two terminals in such a manner that a first resource block allocation for one of the at least two terminals is different from a second resource block allocation for another of the at least two terminals; and sending the resource block allocation generated.]

[3. The method according to claim 2, wherein different terminals can have either identical or different bandwidth allocation, and wherein each of the at least two terminals has at least two user bandwidths and the resource block allocation designates at least one of the user bandwidths.]

4. The method according to claim [3] *1*, wherein the resource block allocation is mutually different and constitutes a fractional rank.

5. The method according to claim 4, wherein the fractional rank is adjusted according to at least one current channel used by the at least two terminals.

6. The method according to claim 5, wherein a first number of orthogonal demodulation reference signals having different overlapping bandwidth allocation is equal to or smaller than a second number of demodulation reference signal blocks in a transmission time interval.

[7. The method according to claim 1, wherein the respective demodulation reference signals are mutually orthogonal based on interleaved frequency division multiple access.]

8. [The method according to claim 7,] *A method, comprising:*

*cyclically shifting with respect to each other, demodulation reference signals of one user bandwidth,*

*wherein respective demodulation reference signals of at least two user bandwidths are mutually orthogonal based on at least one of an orthogonal cover code and a resource block-wise spreading code,*

*wherein the respective demodulation reference signals are mutually orthogonal based on interleaved frequency division multiple access, and* wherein a number of the respective demodulation reference signals is equal to an applied repetition factor.

9. The method according to claim 8, further comprising sending an uplink scheduling grant.

10. The method according to claim 9, wherein the uplink scheduling grant includes an index for a demodulation reference signal resource having a cyclic shift and an orthogonal cover code, and wherein a usage orthogonal cover is configured using a radio resource control message.

11. The method according to claim 9, wherein the uplink scheduling grant includes an index for a demodulation reference signals resource having a cyclic shift and an orthogonal cover code, and wherein a usage orthogonal cover or an interleaved frequency division multiple access comb is tied statically into demodulation reference signal resources.

12. The method according to claim 11, further comprising receiving respective allocation requests from at least two terminals indicating required resources for an intended uplink transmission of the at least two terminals.

[13. An apparatus, comprising:

a sender cyclically shifting with respect to each other, demodulation reference signals of one user bandwidth, said sender including:

means for generating the demodulation reference signals, and means for sending the demodulation reference signals over the one user bandwidth with the demodulation reference signals cyclically shifted with respect to each other, and wherein respective demodulation reference signals are mutually orthogonal based on one of an orthogonal cover code and a resource block-wise spreading code.]

[14. The apparatus according to claim 13, further comprising means for sending an uplink scheduling grant.]

[15. The apparatus according to claim 14, wherein the apparatus allocates resources for at least two terminals, and further comprising means for receiving respective allocation requests from the at least two terminals indicating required resources for an intended uplink transmission of the at least two terminals.]

[16. The apparatus according to claim 15, wherein the apparatus performs multi bandwidth multi-user multiple input multiple output.]

[17. An apparatus allocating resource blocks for at least two terminals, comprising:

means for generating resource block allocation for the at least two terminals with a first resource block allocation for one of the at least two terminals different from a second resource block allocation for another one of the at least two terminals; and means for sending the resource block allocation generated by said generating means, and wherein each of the at least two terminals is configured for at least two user bandwidths and said generating means generates the resource block allocation designating at least one of the two user bandwidths.]

[18. The apparatus according to claim 17, wherein said generating means generates the first and second resource block allocations mutually different with a fractional rank.]

[19. The apparatus according to claim 17, wherein said generating means adjusts the fractional rank according to at least one current channel used by the at least two terminals.]

[20. The apparatus according to any one of claim 19, wherein said generating means and said sending means operate based on respective demodulation reference signals of the at least two user bandwidths being mutually orthogonal.]

[21. The apparatus according to claim 20, wherein a first number of the demodulation reference signals is equal to or smaller than a second number of demodulation reference signal blocks in a transmission time interval.]

[22. The apparatus according to claim 20, wherein the respective demodulation reference signals are mutually orthogonal based on interleaved frequency division multiple access.]

[23. The apparatus according to claim 22, wherein a number of the demodulation reference signals is equal to an applied repetition factor.]

[24. The apparatus according to claim 23, further comprising means for sending an uplink scheduling grant.]

[25. The apparatus according to claim 24, wherein the uplink scheduling grant is included in a radio resource control message, and includes a cyclic shift and an orthogonal cover code.]

[26. The apparatus according to claim 24, wherein the uplink scheduling grant includes at least one of an index for a demodulation reference signal resource having a cyclic shift and an orthogonal cover code or an interleaved frequency division multiple access comb, and wherein at least one of a usage orthogonal cover and the interleaved frequency division multiple access comb is configured using a radio resource control message.]

[27. The apparatus according to any claim 26, wherein the uplink scheduling grant is included in a radio resource control message, and includes the cyclic shift and an orthogonal comb position.]

[28. The apparatus according to claim 27, wherein at least one of the usage orthogonal cover and an interleaved frequency division multiple access component is tied statically into demodulation reference signal resources.]

[29. The apparatus according to claim 28, further comprising means for receiving respective allocation requests from the at least two terminals indicating required resources for an intended uplink transmission of the at least two terminals.]

[30. The apparatus according to claim 29, wherein the apparatus performs multi bandwidth multi-user multiple input multiple output.]

[31. The apparatus according to claim 29, wherein the at least two terminals are user equipment.]

[32. The apparatus according to claim 29, wherein the apparatus is one of a base station and a radio resource controller.]

[33. The apparatus according to claim 29, wherein the apparatus is user equipment.]

[34. The apparatus according to claim 33, wherein the apparatus is implemented in one of a chipset and a module.]

[35. A method, comprising at least one of:

receiving an uplink scheduling grant including at least one of a cyclic shift, an orthogonal cover code, an index for a demodulation reference signal resource having a cyclic shift, and an orthogonal cover code or an interleaved frequency division multiple access comb; and receiving a resource block allocations, including a first resource block allocation for one of at least two terminals that is different from a second resource block allocation for another one of the at least two terminals, and allocating resource blocks for the one of the at least two terminals.]

[36. An apparatus allocating resource blocks for one of at least two terminals, comprising at least one of:

means for generating demodulation reference signals of one user bandwidth with respective demodulation reference signals cyclically shifted with respect to each other, and means for using the demodulation reference signals generated; and means for receiving a resource block allocation for one of the at least two terminals that is different from another resource block allocation for another one of the at least two terminals, and means for allocating the resource blocks for the one of the at least two terminals, and wherein respective demodulation reference signals of at least two user bandwidths are mutually orthogonal based on at least one of an orthogonal cover code and a resource block-wise spreading code, and wherein each of the at least two terminals is configured for the at least two user bandwidths and means for allocating the resource blocks allocates the resource block for at least one of the two user bandwidths.]

[37. The apparatus according to claim 36, wherein the apparatus performs multi bandwidth multi-user multiple input multiple output.]

[38. The apparatus according to claim 36, wherein the at least two terminals are user equipment.]

[39. The apparatus according to claim 38, wherein the apparatus is implemented as a chipset or module.]

[40. A system, comprising:

a sender cyclically shifting with respect to each other, demodulation reference signals of one user bandwidth; and at least two apparatuses allocating resource blocks, each including at least one of:

means for generating demodulation reference signals of one user bandwidth with respective demodulation reference signals cyclically shifted with respect to each other; and means for receiving a resource block allocation that is different from another resource block allocation for another one of the at least two apparatuses and for allocating the resource blocks.]

[41. A computer-readable medium encoded with a computer program that when executed controls a computer to perform a method comprising:

cyclically shifting with respect to each other, demodulation reference signals of one user bandwidth.]

[42. A computer-readable medium encoded with a computer program that when executed controls a computer to perform a method comprising at least one of:

receiving an uplink scheduling grant including at least one of a cyclic shift, an orthogonal cover code, an index for a demodulation reference signal resource having a cyclic shift, and an orthogonal cover code or an interleaved frequency division multiple access comb; and receiving a resource block allocations, including a first resource block allocation for one of at least two terminals that is different from a second resource block allocation for another one of the at least two terminals, and allocating resource blocks for the one of the at least two terminals.]

*43. A method comprising:*

*a user equipment (UE) receiving an uplink scheduling grant including an index for a demodulation reference signal (DM RS) resource, the DM RS resource comprising a cyclic shift and an orthogonal cover code;*

*the UE cyclically shifting a zero-autocorrelation code by the cyclic shift to obtain a first signal;*

*the UE encoding the first signal over two consecutive time slots of a subframe using the orthogonal cover code to obtain a second signal; and*

*the UE transmitting the second signal.*

*44. The method of claim 43, wherein a usage of the orthogonal cover code is configured using a radio resource control (RRC) message received from a network.*

*45. The method of claim 43, wherein the orthogonal cover code has a length of 2.*

*46. The method of claim 45, wherein the orthogonal cover code is selected from the set {[1, 1], [1, −1]}.*

*47. The method of claim 43, further comprising the UE sending an uplink request prior to receiving the uplink scheduling grant.*

*48. The method of claim 43, wherein the uplink scheduling grant includes an allocation of resource blocks for the UE.*

*49. A method comprising:*

*generating, at a base station (BS), a first uplink scheduling grant having a first index indicating a first demodulation reference signal (DM RS) resource, the first DM RS resource comprising a cyclic shift applicable to a zero-autocorrelation code and an orthogonal cover code;*

*sending the first uplink scheduling grant to a first user equipment (UE) in a network communication system;*

*receiving, following the sending, one or more first uplink signals from the first UE, at least one of the first uplink*

*signals having at least one subframe including two consecutive time slots, each of the two consecutive time slots including a respective first DM RS corresponding to the zero-autocorrelation code cyclically shifted by the cyclic shift and encoded by the orthogonal cover code.*

*50. The method of claim 49, wherein the first uplink scheduling grant includes an allocation of resource blocks for the first UE.*

*51. The method of claim 49 further comprising:*

*generating, at the BS, a second uplink scheduling grant having a second index indicating a second demodulation reference signal (DM RS) resource, the second DM RS comprising a second cyclic shift applicable to a second zero-autocorrelation code and a second orthogonal cover code;*

*sending the second uplink scheduling grant to a second UE in the network communication system; and*

*receiving, at the BS, one or more second uplink signals from the second UE, at least one of the second uplink signals having at least one subframe including two consecutive time slots, each of the two consecutive time slots including a respective second DM RS corresponding to the second zero-autocorrelation code cyclically shifted by the second cyclic shift and encoded by the second orthogonal cover code.*

*52. The method of claim 49, wherein the orthogonal cover code is of length 2.*

*53. The method of claim 52, wherein the orthogonal cover code is selected from the set {[1, 1], [1, −1]}.*

*54. The method of claim 53, further comprising demodulating the at least one first uplink signal based on at least one of said respective first DM RS of the at least one subframe.*

*55. The method of claim 54, wherein the demodulating is based on the cyclic shift and the orthogonal cover code.*

*56. The method of claim 54, wherein the demodulating is based on each respective first DM RS of the two consecutive time slots.*

*57. The method of claim 49 further comprising sending, by the BS, a radio resource control (RRC) message in the network communication system, the RRC message being adapted to configure use of the orthogonal cover code by the first UE.*

*58. The method of claim 57, wherein the RRC message is further adapted to configure use of the cyclic shift by the first UE.*

*59. The method of claim 49, further comprising receiving, at the BS, a first resource allocation request prior to sending the first uplink scheduling grant.*

*60. The method of claim 59, wherein said first resource allocation request is an uplink request.*

* * * * *